United States Patent
Priepke et al.

(10) Patent No.: US 8,286,410 B2
(45) Date of Patent: Oct. 16, 2012

(54) NON-ROW SENSITIVE HARVESTING UNIT FOR A CORN HEADER

(75) Inventors: Edward H. Priepke, Lancaster, PA (US); James F. Rayfield, New Holland, PA (US); Douglas S. Fitzkee, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 198 days.

(21) Appl. No.: 12/819,739

(22) Filed: Jun. 21, 2010

(65) Prior Publication Data

US 2011/0308220 A1   Dec. 22, 2011

(51) Int. Cl.
*A01D 45/02*   (2006.01)
(52) U.S. Cl. ............................................. 56/119
(58) Field of Classification Search ............. 56/94, 119, 56/60, 102, 14.3, 103, 104, 59, 66, 73, 75
See application file for complete search history.

(56) References Cited

U.S. PATENT DOCUMENTS

| | | | |
|---|---|---|---|
| 843,866 A | 2/1907 | Bursell | |
| 864,227 A | 8/1907 | Brass | |
| 1,121,740 A | 12/1914 | Markham | |
| 1,155,827 A | 10/1915 | Liebl | |
| 1,964,579 A | 6/1934 | Hyman | |
| 2,527,190 A * | 10/1950 | Kuhlman | 460/28 |
| 2,766,575 A | 10/1956 | Fergason | |
| 3,645,339 A | 2/1972 | Williams | |
| 3,930,354 A * | 1/1976 | Borderie | 56/94 |
| 4,143,504 A | 3/1979 | Noack et al. | |
| 4,581,878 A * | 4/1986 | Vida et al. | 56/114 |
| 5,704,202 A | 1/1998 | Calmer | |
| 5,916,113 A * | 6/1999 | Johnson | 56/94 |
| 6,119,443 A | 9/2000 | Rauch | |
| 6,412,259 B1 * | 7/2002 | Wiegert | 56/60 |
| 6,430,907 B2 * | 8/2002 | Wolters et al. | 56/64 |
| 7,062,896 B2 * | 6/2006 | Resing et al. | 56/64 |
| 7,062,897 B2 * | 6/2006 | Rickert et al. | 56/103 |
| 7,237,373 B2 * | 7/2007 | Resing et al. | 56/104 |
| 7,395,649 B2 * | 7/2008 | Wubbels et al. | 56/52 |
| 7,415,817 B2 * | 8/2008 | Kappelhoff | 56/64 |
| 7,493,745 B2 * | 2/2009 | Wubbles et al. | 56/14.3 |
| 2001/0003237 A1 | 6/2001 | Wolters et al. | |

FOREIGN PATENT DOCUMENTS

DE   3633401 A1   4/1988
DE   10257775 A1   7/2004

* cited by examiner

*Primary Examiner* — Arpad Fabian-Kovacs
(74) *Attorney, Agent, or Firm* — Michael G. Harms (57) ABSTRACT

The non-row sensitive corn harvesting unit utilizes a tine wheel tilted to have tines that extend forwardly and downwardly into a side region of a stalk receiving area bounded by a row divider and which move along an upward and rearward trajectory toward a moving stalk handling element bounding an inlet of a stalk processing or picking channel, for pushing stalks toward the path of the handling element, such that the stalk will be grasped and carried into the channel, providing enhanced non-row sensitivity as well as handling of downed stalks. A companion tine wheel can be provided on the opposite side of the receiving area and function in the same manner.

18 Claims, 7 Drawing Sheets

Fig. 12 ical harvesting machine such as a combine, and more particularly, to a harvesting unit having at least one row divider defining a corn stalk receiving area and at least one advantageously positioned tine wheel configured and rotatable for pushing off center corn stalks received in the area rearwardly toward an inlet opening of a stalk processing channel in cooperation with gathering apparatus, to enable harvesting the stalks, or cobs from the stalks, and improving induction of downed corn.

NON-ROW SENSITIVE HARVESTING UNIT FOR A CORN HEADER

TECHNICAL FIELD

This invention relates generally to a harvesting unit for a corn header of an agricultural harvesting machine such as a combine, and more particularly, to a harvesting unit having at least one row divider defining a corn stalk receiving area and at least one advantageously positioned tine wheel configured and rotatable for pushing off center corn stalks received in the area rearwardly toward an inlet opening of a stalk processing channel in cooperation with gathering apparatus, to enable harvesting the stalks, or cobs from the stalks, and improving induction of downed corn.

BACKGROUND ART

Corn plants are typically planted in rows spaced a predetermined distance apart. It is desired for the row spacing to be substantially uniform, but sometimes, for a variety of reasons, the distance between plants of adjacent rows can vary, sometimes by several inches. In has also become a practice to stagger the plants in the respective rows, e.g., in a zig-zag pattern, for instance, by planting alternating ones of the plants of the row on opposite sides of a centerline of the row, e.g., 3 or more inches from the centerline, such that the adjacent plants are 6 or more inches apart, for instance, to enable placing the plants closer together longitudinally along the row, or for more advantageously arranging nutrient zones for the plants. Still further, there are presently a variety of different row spacing standards, e.g., 38 inch, 36 inch and 30 inch (the latter the most popular in North America); and 80 cm, 75 cm, and 70 cm (the latter the most popular in Europe and the rest of the world). Narrower, e.g., 22 inch and 15 inch (55 cm and 40 cm), spacings are also contemplated.

Modern corn harvesting machines, particularly combines, but also defined here to include silage harvesters, choppers, and the like, have headers including harvesting or picking apparatus or units adapted for harvesting multiple rows of corn simultaneously. When configured as individual harvesting units such as those for harvesting only the corn ears, the units are typically spaced apart distances corresponding to the row spacing of the corn crop being harvested. These harvesting units are configured and operable for receiving the corn stalks and removing the full ears of corn, for conveying by other apparatus to processing apparatus within the harvesting machine. The typical harvesting unit includes a frame supporting forwardly extending, spaced apart dividers defining stalk receiving areas therebetween. The machine is driven such that the dividers are moved forwardly along and between the rows of plants such that the plants enter and pass rearwardly through the stalk receiving areas. The harvesting units include stalk handling apparatus at the rear of and in connection with the stalk receiving area, including stalk handling elements defining a processing or picking channel or gap therebetween into which the stalks are received. The stalk handling elements can comprise a variety of devices or apparatus operable for harvesting the corn ears from the stalks, including fore to aft moving gathering chains having teeth operable for carrying the corn ears rearwardly to the conveying apparatus of the head. The elements can also include fore and aft extending picking or snapping rolls located below stripper bars or plates bounding the channel or gap, the snapping rolls being rotatable for pulling the corn stalk downwardly to bring the stripper bars to bear against the ears to snap or separate them from the stalks. The cobs are then conveyed into the harvesting machine, while the collapsed stalks are left on the field.

Shortcomings observed with the known picking apparatus include a lack of non-row sensitivity, that is, an ability to smoothly intake corn plants spaced or offset from the center line of the picking gap or processing channel of the harvesting or picking units. For example, harvesting units spaced 70 cm apart will have difficulty smoothly harvesting corn plants in rows spaced 80 cm apart, etc. Problems observed include that the row dividers can become entangled with and run over or break off the stalks, or bend the stalks over, resulting in premature detachment and loss of corn ears. Avoiding these problems typically requires slowing the forward speed of the machine and a resultant reduction in productivity. The known apparatus have also been observed to have shortcomings for harvesting downed corn plants, e.g., having stalks bent or broken so as to extend at a small acute angle to horizontal, or even be located on the ground, as opposed to standing generally straight up.

Various additional apparatus have been proposed for enhancing feeding and processing of corn stalks, mostly within the stalk processing channel or picking gap of corn harvesting or picking units. Reference in this regard, Rauch U.S. Pat. No. 6,119,443 issued Sep. 19, 2000. While the Rauch device appears to provide advantageous row non-sensitivity, it is relatively large, involves multiple relatively rotating discs for chopping and/or conveying stalks from more than one stalk receiving channels into a picking gap, and has no ready ability for adaptation for use with a single harvesting or picking unit. There is also no observed enhanced ability to handle downed stalks, and if the discs contact the ground there is an increased risk of them picking up rocks and other debris which can then be conveyed into the harvester.

Reference also variously, Wolters et al., U.S. Patent Publication No. 20010003237 published Jun. 14, 2002; Wubbels et al., U.S. Pat. No. 6,487,839 issued Dec. 3, 2001; Wolters et al., U.S. Pat. No. 7,047,717 issued May 23, 2006; Wubbels et al., U.S. Pat. No. 7,395,649 issued Jul. 8, 2008; and Kapplehoff, U.S. Pat. No. 7,415,817 issued Aug. 26, 2008, each of which utilizes a tine wheel or wheels located mostly or completely above picking apparatus for assisting stalk flow and processing. Shortcomings observed of the above referenced devices for use with harvesting or picking units, include the location of the tine wheels too far above the picking apparatus and/or too far rearward to provide significantly enhanced non-row sensitivity, and so as to be largely ineffectual for aiding in the gathering of downed stalks.

Thus, what is sought is a harvesting unit for a corn header of an agricultural harvesting machine, having improved non-row sensitivity, with an enhance capability for use in downed corn, and which overcomes one or more of the shortcomings set forth above.

SUMMARY OF THE INVENTION

What is disclosed is a harvesting unit for a corn header of an agricultural harvesting machine, such as, but not limited to, a combine, having improved non-row sensitivity, with an enhance capability for use in downed corn, and which overcomes one or more of the shortcomings set forth above.

According to a preferred aspect of the invention, a non-row sensitive harvesting unit includes a frame supporting a pair of spaced apart, forwardly and rearwardly extending stalk handling elements defining a stalk processing channel or picking gap therebetween. The stalk handling elements have spaced apart forward end portions disposed at a first elevation and defining a forwardly facing inlet opening therebetween connecting with the stalk processing channel. As examples, the stalk handling elements can comprise without limitation, gathering chains, snapping rolls, stripper plates, and combinations thereof. The first elevation will be defined in relation to some reference point, which here, for convenience, can be the bottom of a lowermost skid or protector plate of the harvesting unit or other fixed point on the unit. In this regard, this reference skid or plate will typically be supported at a height ranging from just above, e.g., an inch or less, to several inches above the ground surface during harvesting operations, for protecting the harvesting apparatus from ground contact and possible damage. It should also be noted that the angular orientation of the harvesting unit, and the bottom plate can be varied, for instance, for more advantageously harvesting under then present conditions, e.g., standing or downed corn. The unit includes at least one row divider located laterally outwardly of, and extending forwardly from, the forward end portion of one of the stalk handling elements, defining a forwardly open stalk receiving area connecting with the stalk processing channel through the inlet opening. The row divider is stationary on the harvesting unit and preferably has a shape that tapers or leads rearwardly toward the inlet opening so as to be operable for contacting and supporting any stalks in contact therewith as the header is moved forwardly relative to the stalks.

The unit includes a tine wheel constructed and operable according to the invention, having a hub rotatable about a rotational axis therethrough and a plurality of elongate tines extending radially outwardly from the hub at angularly spaced locations around the rotational axis, each of the tines having a radial outermost tip portion. The tine wheel is supported on the frame adjacent to the forward end portion of the one of the stalk handling elements in a manner such that, in combination with the configuration of the tines, particularly the length thereof, at least one of the tines extends downwardly and generally forwardly within a side portion of the stalk receiving area, such that the tip portion of the at least one of the tines is located at about the first elevation or lower. This capability is preferably achieved by orienting the hub such that the rotational axis is generally upwardly and downwardly extending but tilted forwardly at, for instance, but not limited to, an angle of from about 10 to about 30 degrees relative to vertical. As a result, when the tine wheel is drivingly rotated about the rotational axis in a direction for moving the tines sidewardly into the stalk receiving area, e.g., toward a center thereof, the tines will move along an arcuate path rearwardly and gradually upwardly through the side of the stalk receiving area toward a second elevation higher than the first elevation and adjacent to the inlet opening so as to be capable of contacting any stalk in the side portion of the stalk receiving area at about the first elevation and move progressively upwardly and forwardly about the stalk for progressively pushing or urging the stalk upwardly and toward the inlet opening.

As the tine wheel is drivingly rotated, the tines will move in succession in the above manner for pushing or urging any stalks, e.g., random, or a series or row of off center stalks, in the side of the stalk receiving area toward the inlet opening of the processing channel or picking gap. As an advantage of the forward location of the hub and tilt of the tines, the contact between the tines and the stalks will initially be at a lower elevation more toward or on the side of the individual stalks, and will progress upwardly and around to the front of the stalks such that the initial pushing action will be sidewardly toward the center of the stalk receiving area, and then progressively more rearward. An advantage of this combined progressively upward and forward contact and sideward and rearward oriented forces, is that the forces exerted against the stalks are constantly changing both about the circumference and along the height of the stalks. This is desirable as it reduces concentration of forces at a single location or elevation about the stalk that could break or bend the stalks, and abrupt contacts that tend to detach the corn ears, and/or push the stalks over. The initial low contact position and upward path of the trajectory of the tines is also advantageous for lifting and positively guiding downed stalks or stalks close to the ground, toward the inlet opening.

As another advantage, the harvesting unit is preferably configured to be adjustably oriented in a range of positions wherein the row divider can be tilted downwardly and forwardly within a range of angles, to enable varying the first elevation (forward end of the stalk handling elements), e.g., to facilitate harvesting of downed corn, and this will also vary the position and angular orientation of the path of the tines in relation to the ground and the stalks, including so as to be capable of positioning the tip portions of the tines very close to the ground surface, including below the first elevation of the stalk handling elements, if desired or required for a particular application.

According to another preferred aspect of the invention, as noted above, the stalk handling element can be or include a gathering chain configured and supported to move sidewardly along a rear end of the stalk receiving area toward the inlet opening and rearwardly therethrough into the stalk processing channel or picking gap. The chain preferably has a plurality of fingers or teeth which project forwardly into the stalk receiving area and sweepingly move along a path through the inlet opening with the movement of the chain, the fingers being configured to grasp and carry any stalk in the path thereof rearwardly. The tine wheel is preferably configured and positioned such that the tines will move in a cooperating sweeping manner with the fingers of the gathering chain, for smoothly and positively delivering the more sidewardly located ones of the stalks into the path of the fingers so as to be grasped and carried thereby through the inlet opening into the stalk processing channel for processing, without abrupt jarring and chopping actions that could be more likely to detach the ears so as to be lost. As another aspect of the invention, another tine wheel, and optionally another divider, can be located on the opposite side of the stalk receiving area, and operable in the above described manner, for pushing or urging stalks on that side of the area toward the inlet of the stalk handling channel or picking gap at the same time and in the same manner, in cooperation with stalk handling elements on that side of the channel. As a result, the stalks (if any) pushed from the opposite sides of the stalk receiving area are pushed or crowded together, and can act to support each other until processed by the harvesting apparatus, to reduce ear loss and premature stalk breakage and the like.

Additionally, or alternatively, as noted above, the stalk handling element can include a snapping or picking roll, having surface features, such as, but not limited to, a helical flight or flights, cleats, ribs, or the like adapted for grasping stalks brought into contact therewith by the tine wheel and rapidly collapsing the stalks to remove the ears therefrom.

As another preferred aspect of the invention, the tine wheel includes a drive in connection with the stalk handling element, e.g., gathering chain, snapping roll, etc., for rotation thereby. The tine wheel and the drive can also be packaged as a unitary assembly which is easily installable on the frame of the harvesting unit using common fasteners, for positioning the tine wheel in the above described manner and placing the drive, e.g., a sprocket, in engagement with the gathering chain or other source of motive power.

As another capability of the invention, the stalk handling element can be tilted upwardly toward the rearward direction, similarly to or at the same angle as the tilt of the tine wheel, such that the tips of the forwardly extending tines and the forward end portion of the stalk handling element will also be positioned at about the same height above the surface of a field to be harvested.

DETAILED DESCRIPTION OF THE INVENTION

Figure 1:
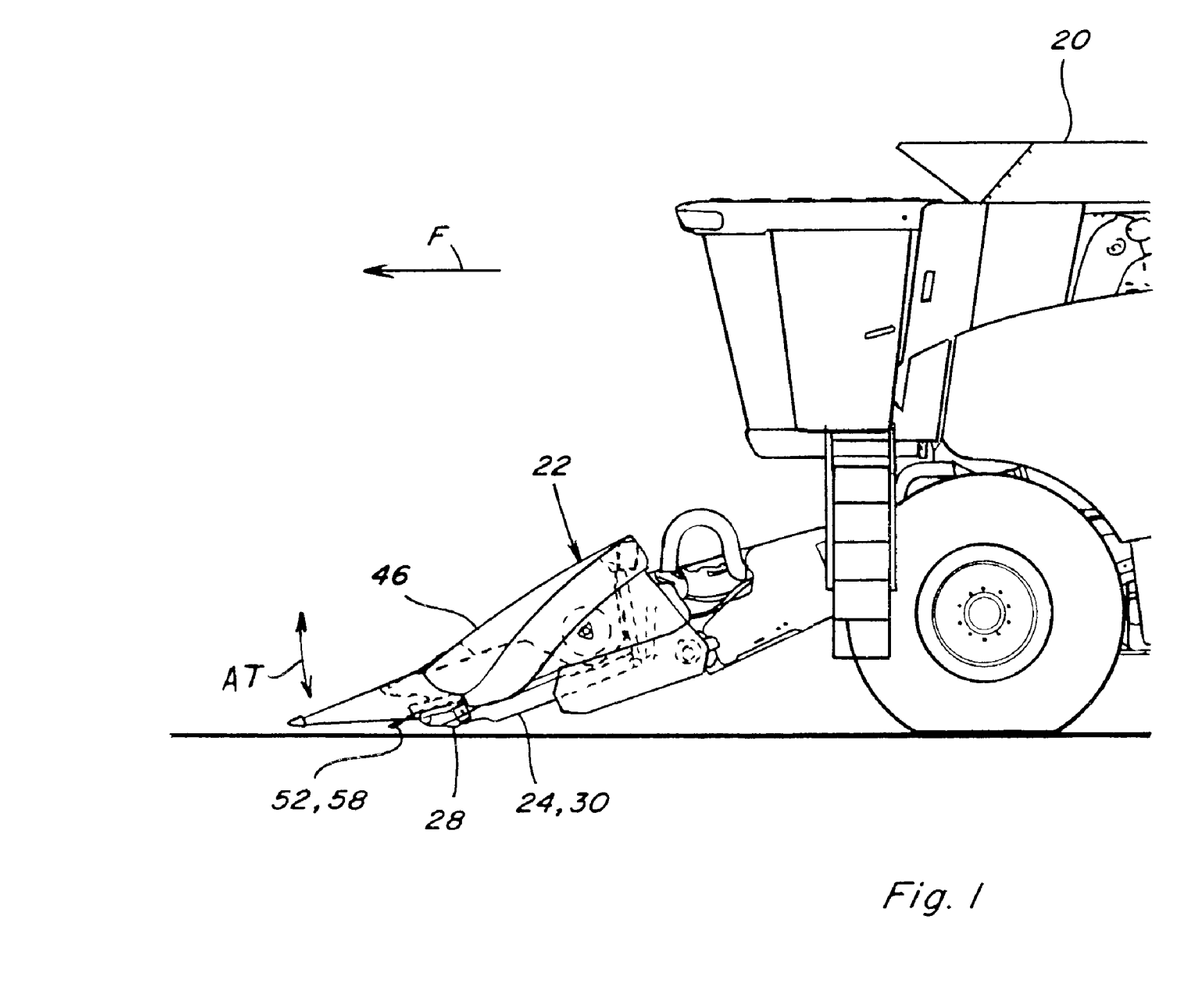
FIG. 1 is a fragmentary side view of the front end of an agricultural harvesting machine, including a header having non-row sensitive harvesting units constructed and operable according to the present invention.

Referring now to the drawings, in FIG. 1, a representative harvesting machine 20, which is a combine, is shown, including a corn header 22 including non-row sensitive harvesting units 24 constructed and operable according to the teachings of the present invention. Here, harvesting units 24 are configured as corn ear harvesting units, that is, they are configured and operable for receiving and gathering the corn stalks as machine moves in a forward direction, denoted by arrow F, and collapsing the stalks downwardly toward the ground, while removing and collecting the corn ears for further processing by machine 20. It is contemplated, however, that harvesting units 24 of the invention have utility and can be configured for use to gather and harvest whole or partial stalks also, for use as silage, biomass, and the like, and therefore is not to be considered as limited to just ear harvesting applications.

Figure 2:
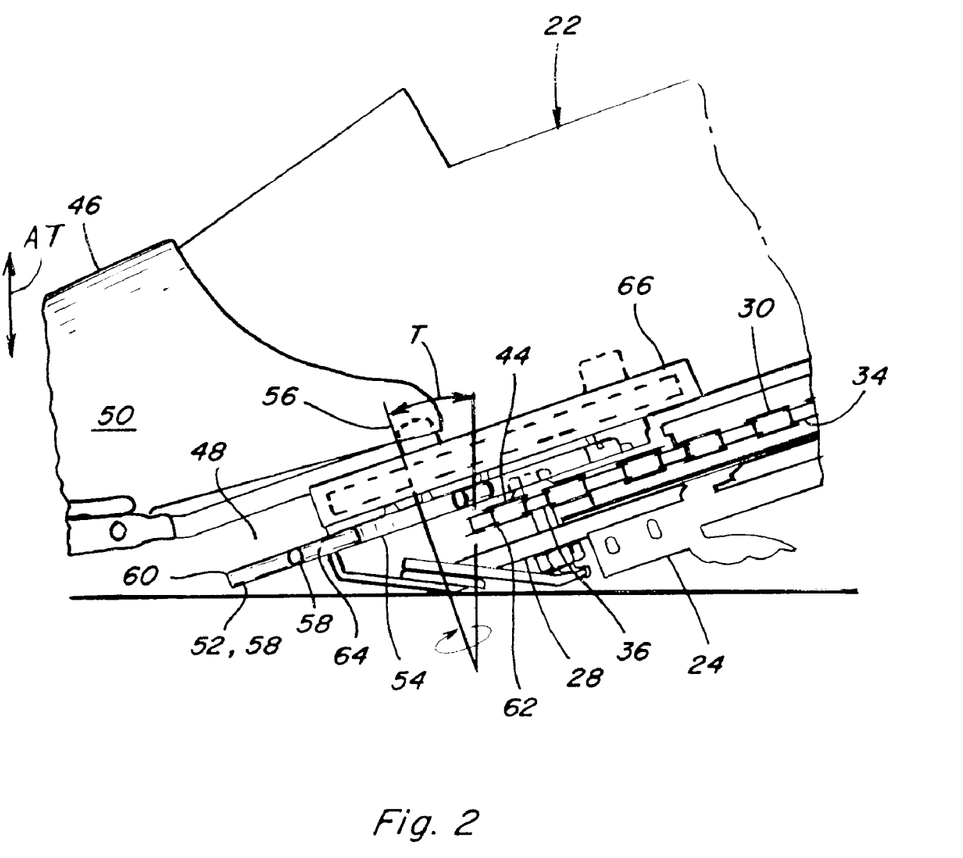
FIG. 2 is a simplified fragmentary side view of the header of FIG. 1, showing aspects of one of the harvesting units of the invention.
Figure 3:
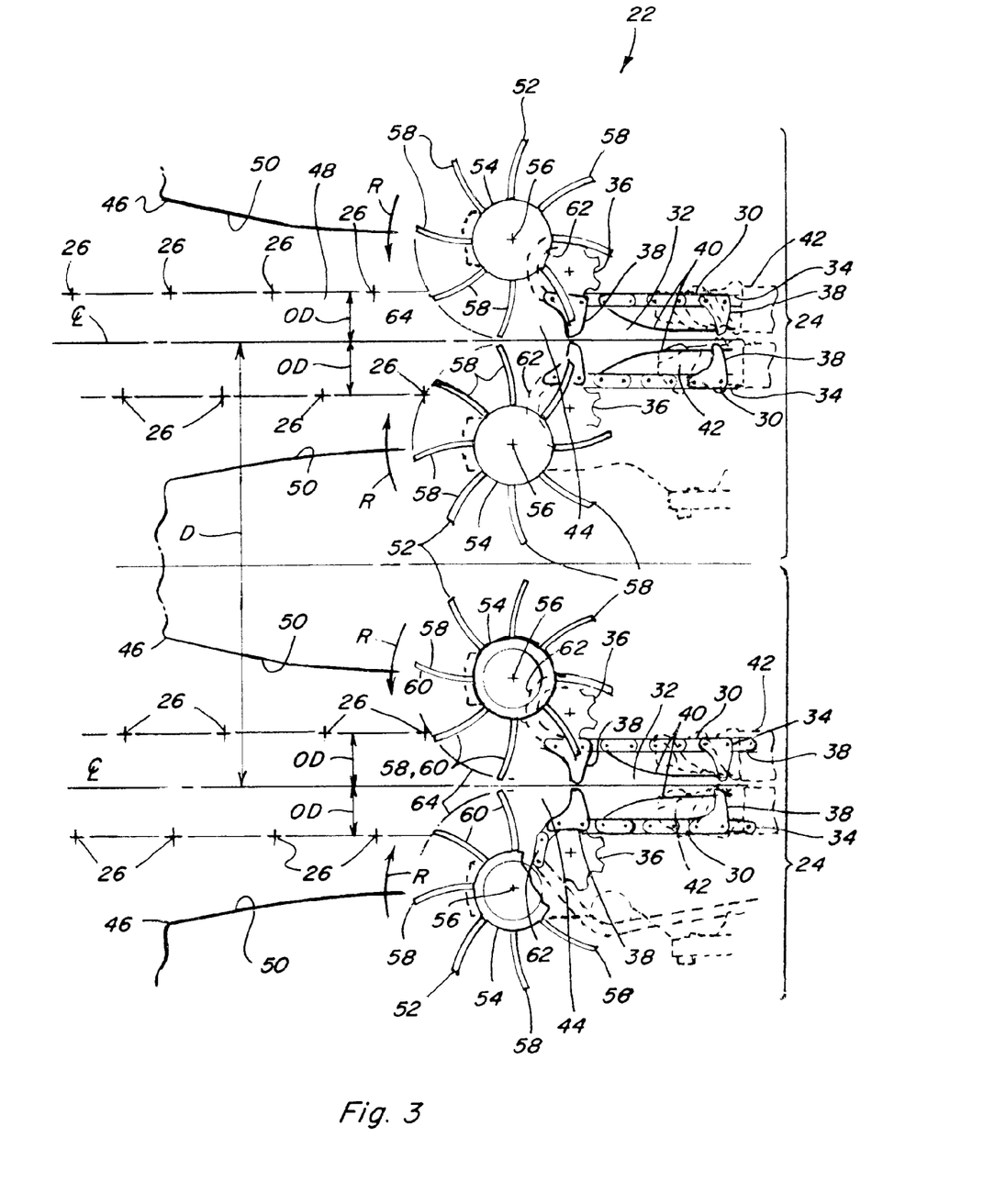
FIG. 3 is a fragmentary top view of the header, showing aspects of several of the harvesting units, in operation for harvesting off center rows of corn stalks.
Figure 4:
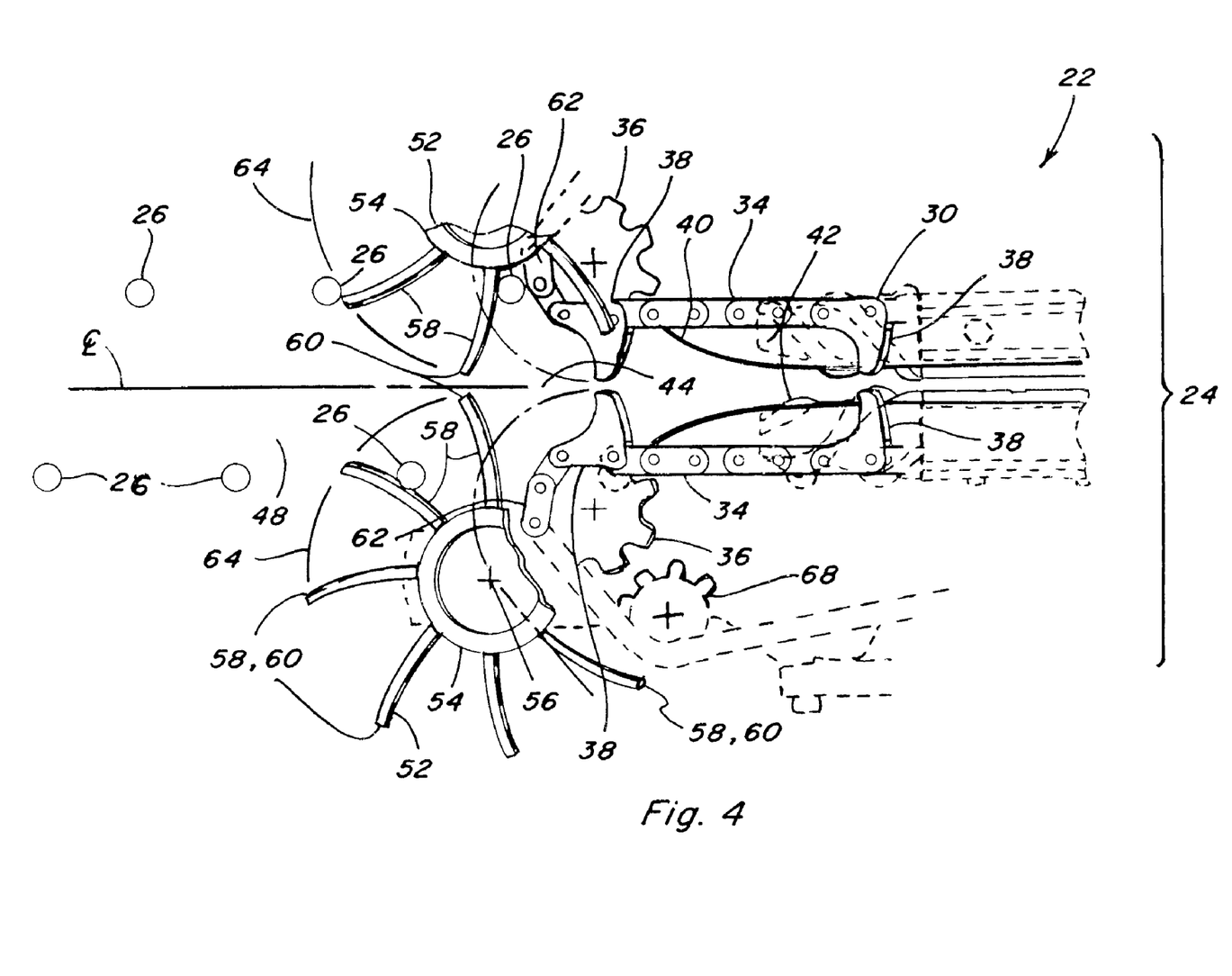
FIG. 4 is a simplified fragmentary top view of one of the harvesting units.

Referring also to FIGS. 2, 3 and 4, corn header 22 includes a sidewardly extending row of harvesting units 24, spaced a predetermined distance apart, as denoted by arrows D in FIG. 3. Distance D will typically be selected based on an average or nominal distance between centerlines CL, also referred to as row spacings, of adjacent rows of corn plants, the stalks 26 of which are denoted by + and ○ marks in FIGS. 3 and 4 respectively. Here, as a representative example, stalks 26 are illustrated as located in staggered locations offset by distances OD from centerlines CL, wherein, which can be for a variety of reasons, such as to provide a greater level of hydration and soil nutrition for the plants compared to if planted directly on centerlines CL. It should also be noted that this is intended to illustrate applications wherein only one offset or off center row of stalks 26 is to be harvested by a harvesting unit, which would be representative of, for example, harvesting rows on 36 inch centerlines with a header having harvesting units spaced 30 inches apart.

Corn header 22 includes a frame 28 of conventional, well known construction, supporting harvesting units 24 in the above-described spaced apart side-by-side relation. Each harvesting unit 24 includes forwardly and rearwardly extending stalk handling elements 30 on opposite sides of and defining a forwardly and rearwardly extending stalk processing channel 32 centered about centerline CL. Here, stalk handling elements 30 include a gathering chain 34 on each side of channel 32. Each gathering chain 34 encircles and is supported by a pair of sprockets, including a forwardly located sprocket 36 mounted for rotation on a forwardly extending portion of frame 28, and a rear drive sprocket (not shown) connected to a drive such as a chain or shaft drive, fluid motor or the like, operable for rotating the drive sprocket for moving the respective gathering chain 34 in a rearward direction along stalk processing channel 32, in the well known manner. Each gathering chain 34 additionally includes a plurality of spaced apart fingers 38 therealong, which project into channel 32 for conveying stalks and loose corn ears rearwardly therealong, the ears toward gathering apparatus at a rearward location on corn header 22, and the stalks for collapsing by other aspects of the stalk handling elements 30, as will be explained next, both in the well known manner.

In this configuration, stalk handling elements 30 also include stripper plates 40 and snapping rolls 42 disposed along the opposite sides of each channel 32. The forward ends of gathering chains 34 and stripper plates 40 on opposite sides of channel 32 define an inlet opening 44 in connection with channel 32, the snapping rolls 42 on the opposite sides being drivingly counter-rotated about forwardly and rearwardly extending axes, respectively, for grasping stalks 26 located within channel 32, and driving them downwardly to collapse them, while driving the corn ears against stripper plates 40, for detaching the ears from the stalks, again, in the well known manner.

Each harvesting unit 24 includes a pair of spaced apart, forwardly extending row dividers 46, bounding opposite sides of a forwardly open stalk receiving area 48 in connection with inlet opening 44. Each row divider 46 has a side surface 50 which faces stalk receiving area 48, and preferably tapers at least at the forward end thereof, again, in the well known manner, for separating the stalks to be harvested by the respective units 24 and supporting the more sidewardly located stalks during the forward movement of corn header 20 in relation to the plants. Here, it should be noted that, for purposes of the invention, namely, row non-sensitivity, in particular, for handling stalks offset from centerline CL by amount OD or more, row dividers 46 are positioned a distance greater than offset distance OD from centerline CL, to enable receiving and accommodating or gathering the off center stalks. It should be noted, however, that for a more conventional harvesting capability, dividers 46 would normally be located closer together.

The above described stalk handling elements 30 with row dividers 46, function suitably for handling and harvesting corn plants when located on or closely about centerline CL. However, for off center plants, which can include those located as shown in FIGS. 3 and 4, as well as those planted on centerlines not equal to the distance D between harvesting units of a corn header, and for downed corn wherein the stalks are not standing upright but are leaned over in one or more directions, elements 30 and row dividers 46 alone are often inadequate, and in particular, attempting to guide off center stalks of corn plants corn toward the centerline CL and into inlet opening 44 using only dividers 46 can result in the stalks being pushed over, premature stalk breakage, loss of corn ears, and other problems.

To overcome at least some of the above problems, including to improve yield when harvesting rows on centerlines spaced several inches differently from centerline D of the harvesting units, harvesting units 24 each include tine wheels 52 configured and operable for facilitating the non-row sensitivity of the units, that is, the ability to induct and handle off center corn plants, and for improving harvest of downed corn under a variety of conditions. Each tine wheel 52 has a hub 54 drivingly rotatable about a rotational axis 56 therethrough, and a plurality of elongate tines 58 extending radially outwardly from hub 54 at angularly spaced locations around rotational axis 56. Each of tines 58 has a radial outermost tip portion 60. Tine wheels 52 are supported on frame 28 of the row units such that hubs 54 are located adjacent to forward end portions 62 of stalk handling elements 30. Here, this location is just above, and sidewardly of, the sprockets 36 of the gathering chains 34, such that fingers 38 of the chains pass below hubs 54. Appropriate slots are provided in row dividers 46 for passage of tines 58, or the tines can pass below the overlaying portions of the dividers, as desired or required.

The rotational axes 56 are upwardly oriented and tilted at least generally forwardly, and tines 58 have a length, such that the forwardly extending tines extend downwardly also and one of the tines will be located adjacent to a side portion of the stalk receiving area 48 immediately adjacent side surface 50, and such that the tip portion 60 of the tine will extend down to about the same elevation (denoted the first elevation) as the forward end portions 62 of the stalk handling elements 30. Again, the tines can be located below the associated divider (FIG. 2) or appropriate slots in the row dividers can be provided to facilitate this capability. As a non-limiting example, the forward tilt of axis 56, denoted by angle T in FIG. 2, will be from about 10 to about 30 degrees relative to vertical, and tines 58 are preferably configured so as to be oriented at about the same angle relative to horizontal.

Here also, it can be observed in FIG. 2, that stalk handing elements 30, as illustrated by gathering chain 34, can be oriented at about the same angle relative to horizontal as the tines, although it is not required. FIGS. 1 and 2 show an arrow AT which denotes a representative range of angles of tilt of header 22, for accommodating different harvesting conditions, as a result, angle T relative to true vertical can be changed by changing angle AT, but this will not change the angle of the tine wheels relative to other aspects of the harvesting unit. In FIGS. 3 and 4, it can be observed that the length of tines 58 in combination with the positions of hubs 54 are such that the tines preferably extend through the side of the stalk receiving area about to, but not beyond, centerline CL. This eliminates any possibility of the tines of opposing tine wheels contacting one another, and thus the need for timing apparatus, slip clutches or the like for preventing damage in the event of contact. As a result of this arrangement, when tine wheels 52 are rotated about axis 56 in a direction R for moving the tines through stalk receiving area 48, the tip portions 60 thereof will move along an arcuate path 64 rearwardly (FIGS. 3 and 4) and upwardly (FIG. 2) through the side of the stalk receiving area toward a second elevation higher than the first elevation and adjacent to or into inlet opening 44.

The tines will contact any stalk 26 in the side portion of stalk receiving area 48 within the area bounded by arcuate path 64 at about the first elevation or higher and move progressively upwardly and forwardly about the stalk 26 for progressively pushing the stalk 26 toward inlet opening 44, in a manner for facilitating induction of the stalk into the stalk processing channel, but in a manner to reduce breakage, excessive leaning, and premature ear loss.

Figure 5:
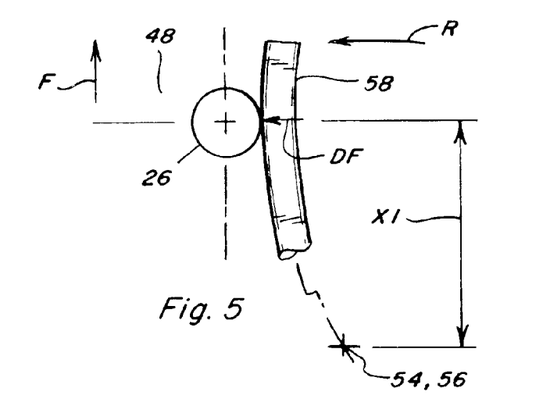
FIG. 5 is a simplified schematic top view of a corn stalk showing initial contact by a tine of a harvesting unit.
Figure 6:
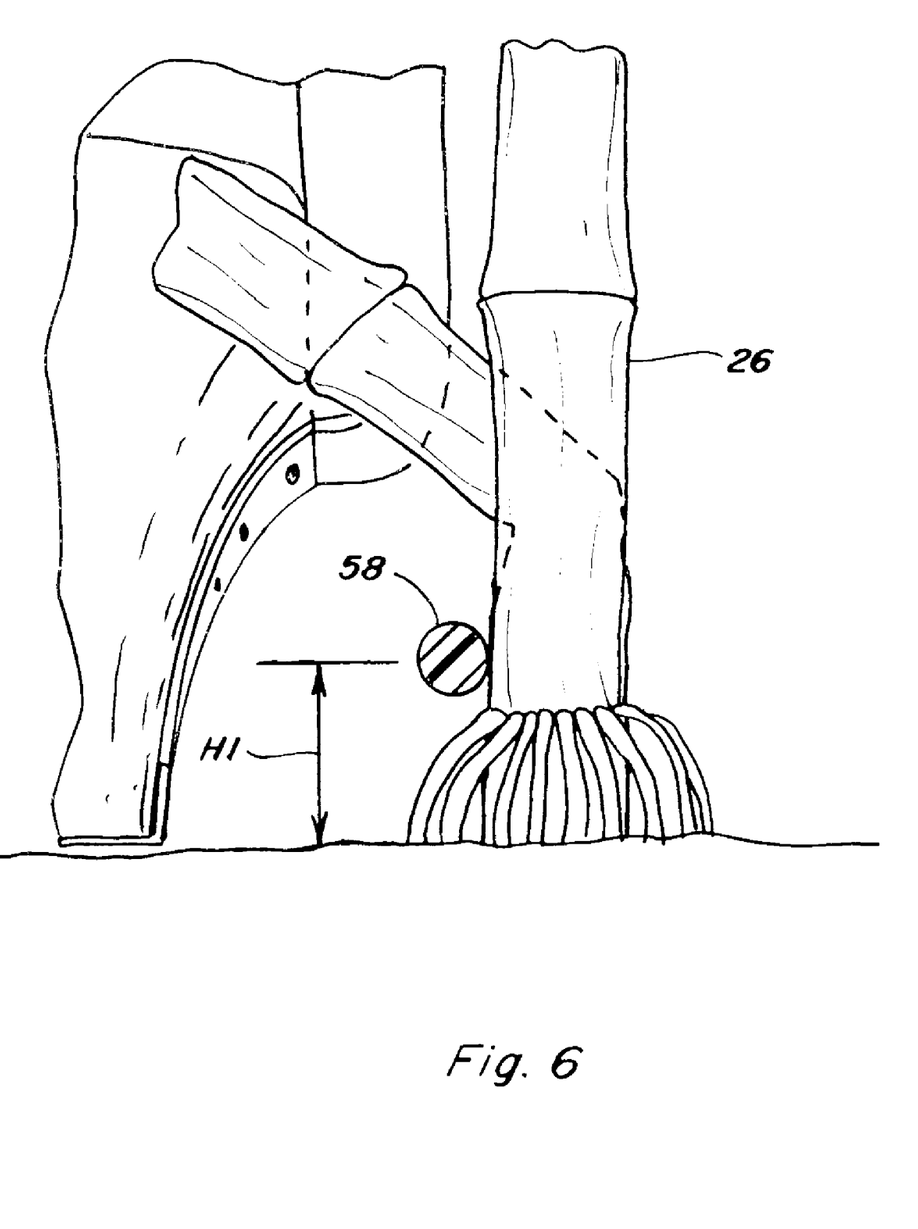
FIG. 6 is a simplified schematic side view of a corn stalk showing initial contact by a tine of a harvesting unit, corresponding generally to FIG. 5.

Referring also to FIGS. 5 through 12, a series of drawings illustrating the contact and pushing action of a tine 58 on a representative stalk 26 are provided. In FIGS. 5 and 6, stalk is shown in solid lines standing upright, and in dotted lines bent or tilted to some extent, for illustrating a representative downed corn condition. Tine 58 is shown rotated in direction R about rotational axis 56 of hub 54, so as to initially contact, and exert an initial displacement force DF or push, directly sidewardly against a side of stalk 26 in stalk receiving area 48, at a distance X1 in the forward direction F from axis 56, and at a height H1 above the ground which will be at about the first elevation referenced above, to begin urging the stalk more toward the middle of area 48.

Figure 7:
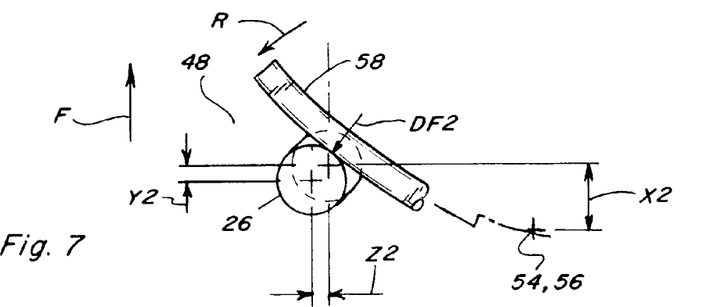
FIG. 7 is another simplified schematic top view of a corn stalk, showing continued contact by a tine of a harvesting unit.
Figures 8, 10:
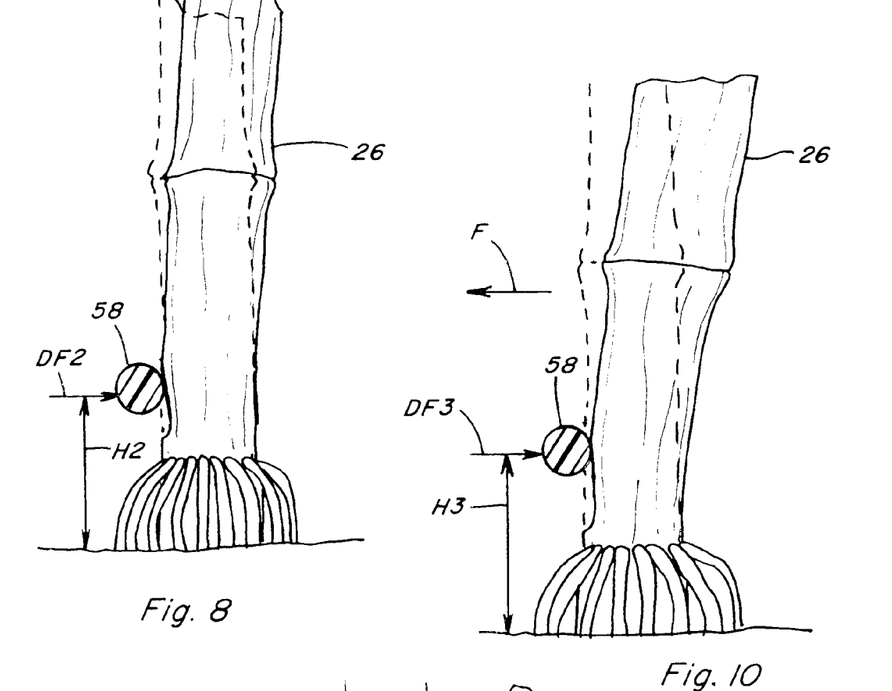
FIG. 8 is another simplified schematic side view of a corn stalk showing continued contact by a tine of a harvesting unit, corresponding generally to FIG. 7.
FIG. 10 is still another simplified schematic side view of a stalk showing further contact by a tine of a harvesting unit, corresponding generally to FIG. 9.
Figure 9:
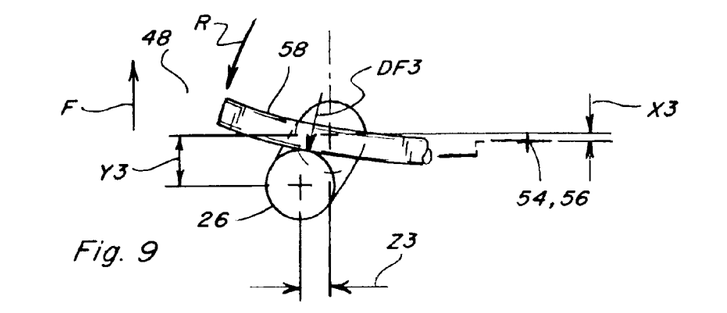
FIG. 9 is still another simplified schematic top view of a stalk showing continued contact by a tine of a harvesting unit.

In FIGS. 7 and 8, tine 58 is shown rotated in direction R about axis 56 of hub 54, so as to begin to contact more of a forward side of stalk 26 in area 48, at a distance X2 from axis 56, representing forward progression of the machine relative to the stalk in direction F, and at a height H2 above the ground, which is greater than height H1. The speed of rotation in direction R, which is now more rearward, will typically be greater than the machine speed in opposite direction F. Even with the forward movement of the machine, the rotational speed is sufficient such that it can be observed that a displacement force DF 2 is being exerted by the tine 58 against the stalk 26, such that the stalk is now being displaced or pushed rearwardly also, but more importantly, still more sidewardly toward the center of area 48, as represented by displacements Y2 and Z2. In FIGS. 9 and 10, tine 58 is shown rotated further in direction R about axis 56 of hub 54, so as to be more rearward, and so as to continue to contact the forward side of stalk 26 in area 48, at a distance X3 from axis 56, representing greater forward progression of the machine relative to the stalk in direction F, and at a height H3 above the ground, which is greater than heights H1 and H2. Even with the forward movement of the machine, the rotational speed is sufficient such that it can be observed that a displacement force DF 3 is being exerted by the tine 58 against the stalk 26. It can be observed that the stalk 26 is now being displaced or pushed even more rearwardly and toward the center of area 48, as denoted by displacements Y3 and Z3.

Figure 11:
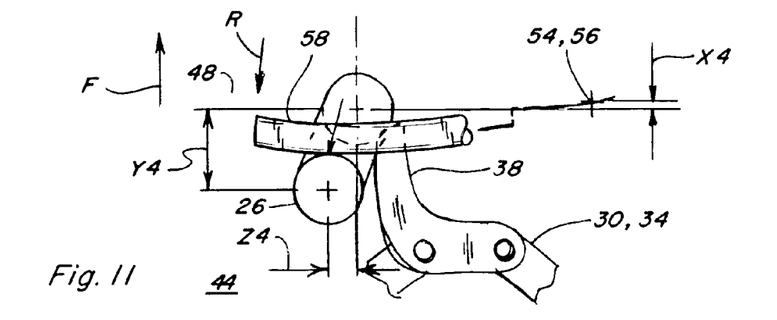
FIG. 11 is still another simplified schematic top view of a stalk showing contact by a tine of a harvesting unit.
Figure 12:
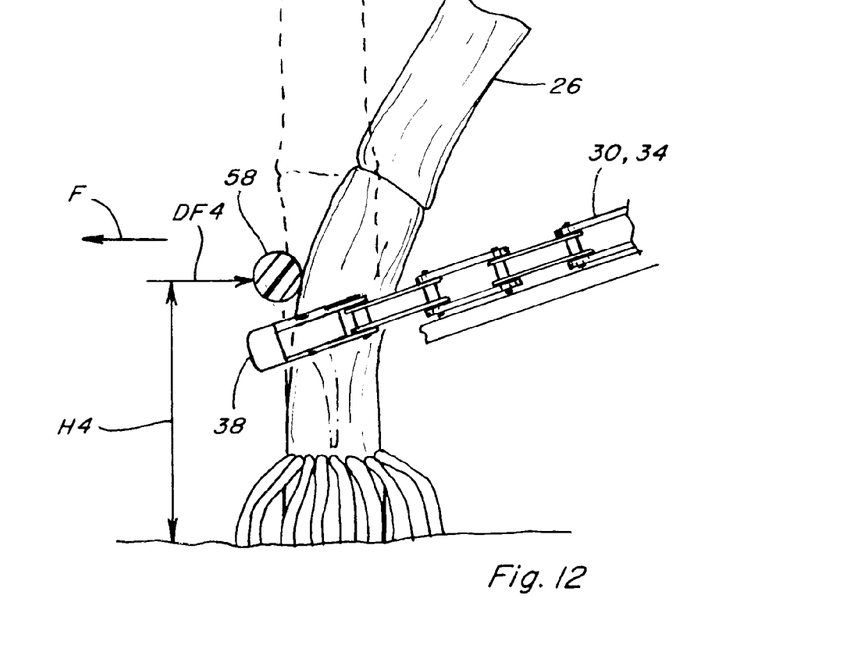
FIG. 12 is still another simplified side view of a stalk showing contact by a tine of a harvesting unit and interaction with a handling element of the harvesting unit, corresponding generally to FIG. 11.

And, in FIGS. 11 and 12, tine 58 is shown rotated even more rearwardly in direction R about axis 56 of hub 54, so as to still contact the forward side of stalk 26 in area 48, at a distance X4 from axis 56, representing even more forward progression of the machine relative to the stalk in direction F, and at a height H4 above the ground, which is greater than heights H1 through H3 and about equal to the second elevation discussed above. The displacement force DF4 pushing the stalk continues to displace or push, or at least hold the stalk displaced rearwardly, but more importantly, the sideward displacement Z4 has been maintained, such that the stalk is now located and positively held or maintained in the path of a finger 38 of gathering chain 34 of handling elements 30 so as to be grasped or pushed and guided thereby into inlet opening 44, for processing in the above described manner. In this regard, tines 58 can have a curved or swept back shape relative to rotational direction R, to facilitate maintaining sideward displacement of the stalks. Also, because of the tilt of the tine wheel, tines 58 will pass above the stalk handling elements 30 as the tines continue rotation R.

It can be conceptualized from viewing FIGS. 5 through 12, that harvesting units 24 including tine wheels 52 configured and operable in cooperation with stalk handling elements according to the invention, have utility for positively displacing corn stalks toward the center of the processing channel or picking gap from a wide range of positions and when in a variety of orientations including at small angles to horizontal and extending in a variety of directions, e.g., downed corn, to facilitate induction into the harvesting units, and harvest thereof, while reducing ear loss and other problems. It should also be appreciated that the present invention has utility for improving non-row sensitivity for many planting configurations in addition to the exemplary one illustrated.

Tine wheels 52 can be drivingly rotated in directions R in any suitable manner, such as, but not limited to, by a drive mechanism of the associated harvesting unit 24, or separately, for instance by a chain, belt and/or shaft drive, or motor such as a fluid or electric motor. As a non-limiting example, as illustrated in FIGS. 2, 3 and 4, a drive or gear box 66 can be provided including a drive sprocket 68 enmeshed with gathering chain 34 for rotation thereby, and drivingly connected to hub 54 via a chain arrangement, gear arrangement, belt, or shaft drive, as desired or required for effecting rotation R.

Here also, it should be noted that although tine wheels 52 are shown in association with both of the stalk handling elements of the respective harvesting units 24, the invention has utility for use of only one tine wheel, on only one side of a harvesting unit, and therefore is not limited to just a dual tine wheel configuration.

In light of all the foregoing, it should thus be apparent to those skilled in the art that there has been shown and described a non-row sensitive harvesting unit for a corn header and method of operation of the same. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A non-row sensitive harvesting unit for a corn head, comprising:
 a frame supporting a pair of spaced apart, forwardly and rearwardly extending stalk handling elements defining a stalk processing channel therebetween, the stalk handling elements having spaced apart forward end portions disposed at a first elevation and defining a forwardly facing inlet opening therebetween connecting with the stalk processing channel;
 a row divider located laterally outwardly of, and extending forwardly from, the forward end portion of one of the stalk handling elements, defining a forwardly open stalk receiving area connecting with the stalk processing channel through the inlet opening, the row divider being operable for contacting and supporting stalks in contact therewith as the header is moved forwardly relative to the stalks;
 a tine wheel including a hub having a rotational axis therethrough and a plurality of elongate tines extending radially outwardly from the hub at angularly spaced locations around the rotational axis, each of the tines having a radial outermost tip portion, the tine wheel being supported on the frame such that the hub is located adjacent to the forward end portion of the one of the stalk handling elements, such that at least one of the tines extends downwardly and generally forwardly into a side portion of the stalk receiving area and the tip portion of the at least one of the tines is located at about the first elevation, and such that when the tine wheel is rotated about the rotational axis in a direction for moving the at least one tine farther into the stalk receiving area, the tip portion thereof will move along an arcuate path rearwardly and upwardly through the side of the stalk receiving area toward a second elevation higher than the first elevation and adjacent to the inlet opening so as to contact any stalk in the side portion of the stalk receiving area at about the first elevation and move progressively upwardly and forwardly about the stalk for progressively pushing the stalk upwardly and rearwardly toward the inlet opening, wherein the one of the stalk handling elements comprises a gathering chain configured and supported to move sidewardly along a rear end of the stalk receiving area toward the inlet opening and rearwardly therethrough into the stalk processing channel, the chain having plurality of fingers which project forwardly into the stalk receiving area and sweepingly move along a path through the inlet opening with the movement of the chain, the fingers being configured to grasp and carry any stalk in the path thereof toward the inlet opening, and wherein the tine wheel is positioned and oriented such that when the tine wheel is rotated the tip portions of the tines will move in a rearward and upward direction to push stalks in contact therewith into the path of the fingers so as to be grasped and carried thereby through the inlet opening into the stalk processing channel.

2. The harvesting unit of claim 1, additionally comprising a drive connecting the tine wheel to the gathering chain so as to be rotated by the movement thereof.

3. The harvesting unit of claim 1, wherein the hub is positioned and the tines have a length such that when the tine wheel is rotated the tip portions of the tines will pass marginally above the teeth of the chain.

4. The harvesting unit of claim 1, comprising a second one of the tine wheels supported on the frame adjacent to the forward end portion of a second one of the stalk handling elements.

5. The harvesting unit of claim 1, wherein the tine wheel includes at least six of the tines.

6. The harvesting unit of claim 1, wherein the tines are tilted forwardly at between about a 10 degree and a 30 degree angle relative to horizontal.

7. A non-row sensitive harvesting unit for a corn head, comprising:
   a frame supporting a pair of spaced apart, forwardly and rearwardly extending stalk handling elements defining a stalk processing channel therebetween, the stalk handling elements having spaced apart forward end portions disposed at a first elevation and defining a forwardly facing inlet opening therebetween connecting with the stalk processing channel;
   at least one row divider located laterally outwardly of, and extending forwardly from, the forward end portion of one of the stalk handling elements, defining a side of a forwardly open stalk receiving area connecting with the stalk processing channel through the inlet opening, the row divider being operable for contacting and supporting stalks located in a sideward region of the stalk receiving area as the header is moved forwardly relative to the stalks;
   at least the one of the stalk handling elements comprising a gathering chain configured and supported to move sidewardly along a rear end of the stalk receiving area toward the inlet opening and rearwardly therethrough into the stalk processing channel, the chain having plurality of fingers at spaced locations therealong, at least some of the fingers projecting forwardly into the crowding area at a first elevation such that when the chain is moved the forwardly projecting fingers will sweepingly move along a path toward and into the inlet opening;
   a tine wheel including a hub having a rotational axis therethrough and a plurality of elongate tines extending radially outwardly from the hub at angularly spaced locations around the rotational axis, each of the tines having a radial outermost tip portion, the tine wheel being supported on the frame such that the hub is located adjacent to the forward end portion of the one of the stalk handling elements, the tines being oriented such that forwardly extending ones thereof extend downwardly into a side portion of the stalk receiving area with the tip portions thereof located at about the first elevation and rearwardly ones of the tines extend upwardly and rearwardly from the hub, and such that when the tine wheel is rotated for moving the forwardly extending tines toward a center of the stalk receiving area, the tip portions thereof will move along an arcuate path rearwardly and upwardly through the side of the stalk receiving area and toward the inlet opening to a second elevation above the forwardly projecting fingers of the gathering chain so as to contact stalks in the side portion of the stalk receiving area at about the first elevation and move progressively upwardly and forwardly about the stalks to progressively push the stalks at least somewhat upwardly toward the inlet opening and into the path of the fingers so as to be grasped and carried thereby into the stalk processing channel.

8. The harvesting unit of claim 7, additionally comprising a drive connecting the tine wheel to the gathering chain so as to be rotated by the movement thereof.

9. The harvesting unit of claim 7, wherein the hub is positioned and the tines have a length such that the tip portions of the tines will pass just above the fingers of the chain when the tine wheel is rotated.

10. The harvesting unit of claim 7, comprising a second one of the tine wheels supported on the frame adjacent to the forward end portion of a second one of the stalk handling elements.

11. The harvesting unit of claim 7, wherein the tine wheel is tilted forwardly such that the rotational axis is tilted at between about a 10 degree and a 30 degree angle to vertical.

12. The harvesting unit of claim 7, wherein the tine wheel comprises a drive in connection with the hub and configured to be rotated by an element of the harvesting unit, the tine wheel and the drive being installed as a unit on the frame.

13. The harvesting unit of claim 12, wherein the element of the harvesting unit comprises the gathering chain.

14. A non-row sensitive harvesting unit for a corn head, comprising:
   a frame supporting a pair of spaced apart, forwardly and rearwardly extending stalk handling elements defining a stalk processing channel therebetween, the stalk handling elements having spaced apart forward end portions disposed at a first elevation and defining a forwardly facing inlet opening therebetween connecting with the stalk processing channel;
   a pair of row dividers located laterally outwardly of, and extending forwardly from, the forward end portions of the stalk handling elements, respectively, defining and bounding sides of a forwardly open stalk receiving area connecting with the stalk processing channel through the inlet opening, the row dividers being operable for contacting and supporting stalks located in the sideward regions of the stalk receiving area as the header is moved forwardly relative to the stalks;
   each of the stalk handling elements comprising a gathering chain configured and supported to move sidewardly along a rear end of the stalk receiving area toward the inlet opening and rearwardly therethrough into the stalk processing channel, the chain having plurality of fingers at spaced locations therealong, at least some of the fingers projecting forwardly into the stalk receiving area at a first elevation such that when the chain is moved the forwardly projecting fingers will sweepingly move along a path toward and into the inlet opening;
   a pair of tine wheels, each of the tine wheels including a hub having a rotational axis therethrough and a plurality of elongate tines extending radially outwardly from the hub at angularly spaced locations around the rotational axis, each of the tines having a radial outermost tip portion, the tine wheels being supported on the frame such that the hubs thereof are located adjacent to the forward end portions of the stalk handling elements, respectively, and are tilted forwardly so that forwardly extending ones of the tines extend downwardly into the side portions of the stalk receiving area with the tip portions thereof located at about the first elevation and rearwardly extending ones of the tines extend upwardly above the stalk handling elements, respectively, and such that when the tine wheels are rotated for moving the forwardly extending tines toward a center of the stalk receiving area, the tip portions thereof will move along arcuate paths rearwardly and upwardly through the sides of the stalk receiving area and toward the inlet opening to a second elevation above the forwardly projecting fingers of the gathering chains so as to contact any stalks in the side portions of the stalk receiving area at about the first elevation and move progressively upwardly and forwardly about the stalks to progressively crowd the stalks toward the inlet opening and into the paths of the fingers so as to be grasped and carried thereby into the stalk processing channel.

15. The harvesting unit of claim 14 additionally comprising drives connecting the tine wheels to the gathering chains so as to be rotated by the movement thereof, respectively.

16. The harvesting unit of claim 14, wherein the hubs are positioned and the tines have a length such that the tip portions of the tines will pass marginally above the fingers of the chains when the tine wheels are rotated.

17. The harvesting unit of claim 14, wherein the hubs of the tine wheels are tilted such that the rotation axes thereof are oriented at between about a 10 degree and a 30 degree angle to vertical.

18. The harvesting unit of claim 14, wherein the tine wheels each comprise a drive in connection with the hub thereof configured to be rotated by an element of the harvesting unit, each of the tine wheels and the drive thereof being installed as a unit on the frame.

* * * * *